United States Patent [19]

Hayashida

[11] 4,051,928
[45] Oct. 4, 1977

[54] AUTOMATIC SHOE CLEARANCE ADJUSTING DEVICE IN SHOE DRUM BRAKE

[75] Inventor: Yoshihiro Hayashida, Chigasaki, Japan

[73] Assignee: Tokico Ltd., Japan

[21] Appl. No.: 689,988

[22] Filed: May 26, 1976

[30] Foreign Application Priority Data

May 30, 1975 Japan .................................. 50-64995

[51] Int. Cl.² ............................................. F16D 65/56
[52] U.S. Cl. ........................ 188/79.5 P; 188/196 BA
[58] Field of Search ....... 188/79.5 P, 196 C, 196 BA, 188/196 F, 79.5 B

[56] References Cited
U.S. PATENT DOCUMENTS 2,570,398 10/1951 Smith ........................... 188/79.5 B
3,583,532 6/1971 Hodkinson ................. 188/196 BA X
3,621,947 11/1971 Margetts ....................... 188/79.5 P
3,719,258 3/1973 Margetts ....................... 188/79.5 P Primary Examiner—Stephen G. Kunin
Assistant Examiner—Douglas C. Butler
Attorney, Agent, or Firm—Wenderoth, Lind & Ponack

[57] ABSTRACT

An automatic shoe clearance adjusting device in a shoe drum brake includes a strut of adjustable length having an adjust nut with ratchet teeth on the outer periphery thereof, an adjust lever having a pawl at one end thereof for cooperating the ratchet teeth, and a coil spring acting on the adjust lever for moving the pawl of the lever circumferentially and radially relative to the adjust nut by torsional and compressive forces respectively. A point through which the torsional force is transmitted to the lever, a point through which the torsional force is received by another member normally, and a fulcrum point around which the layer pivots in the radial direction are arranged such that these three points are adjacent to each other.

4 Claims, 11 Drawing Figures

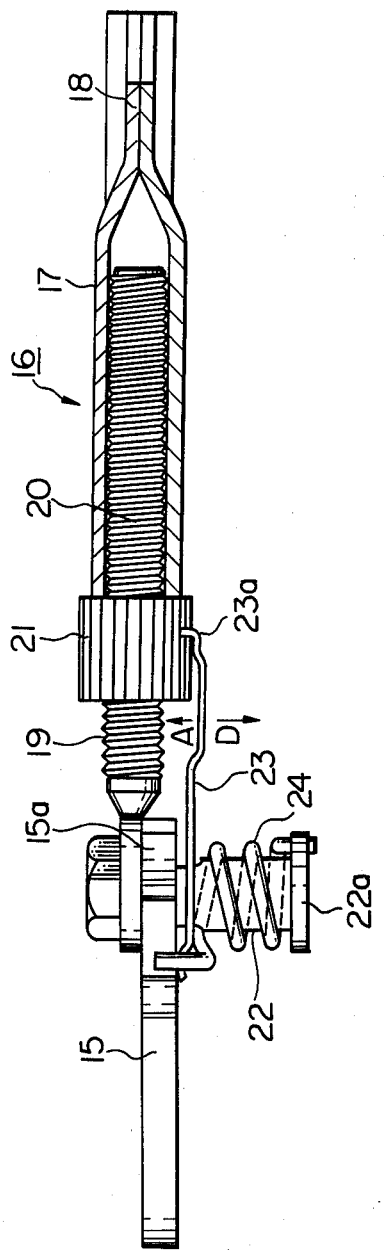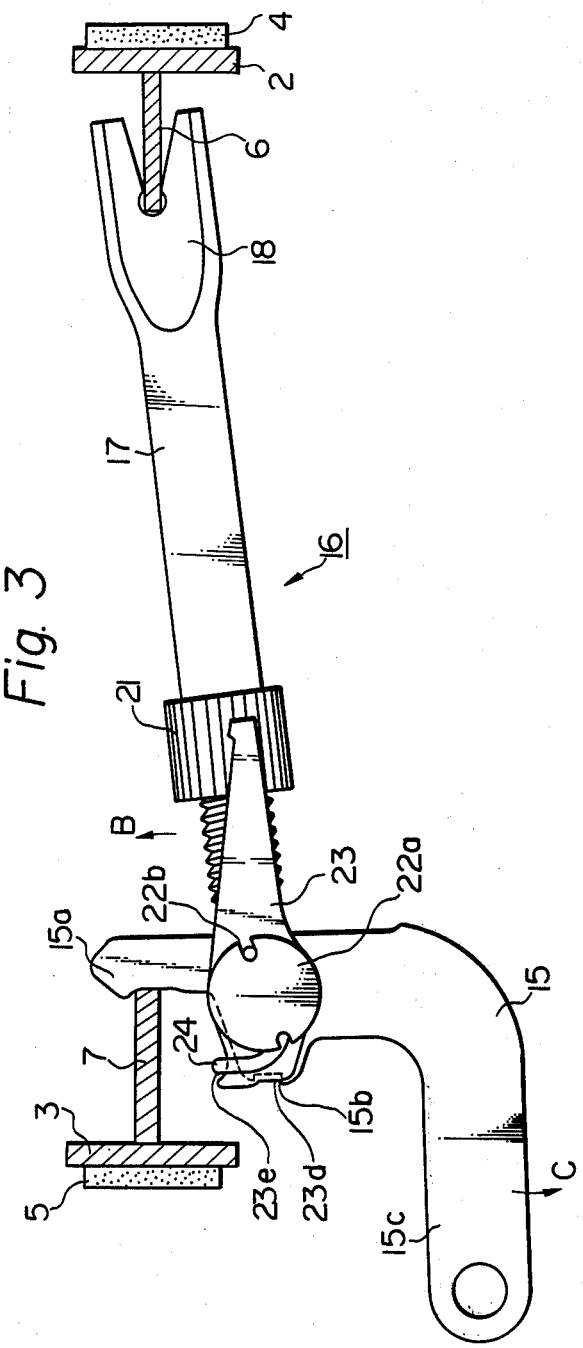

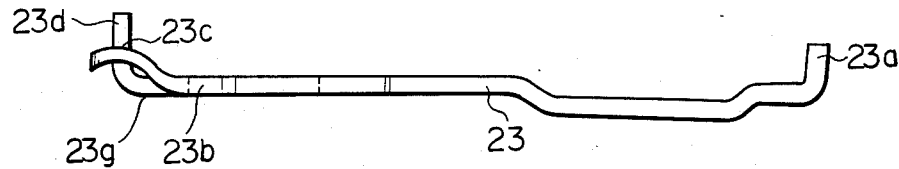
Fig. 4
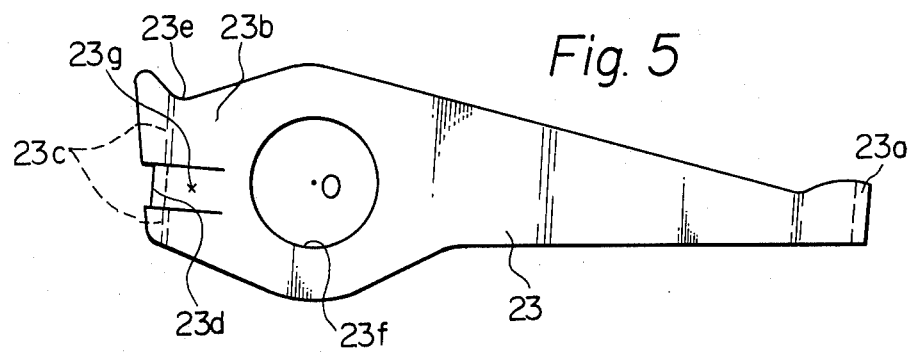
Fig. 5
Fig. 6
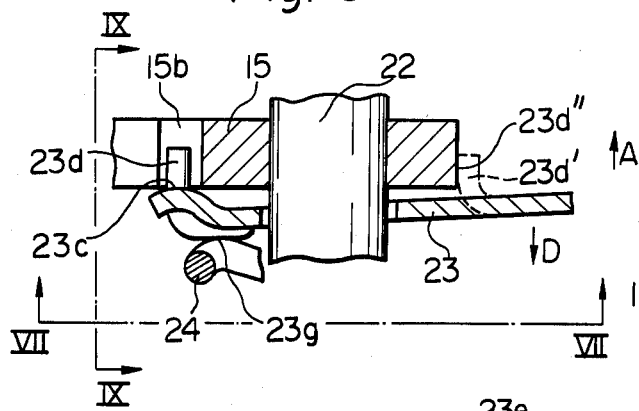
Fig. 7
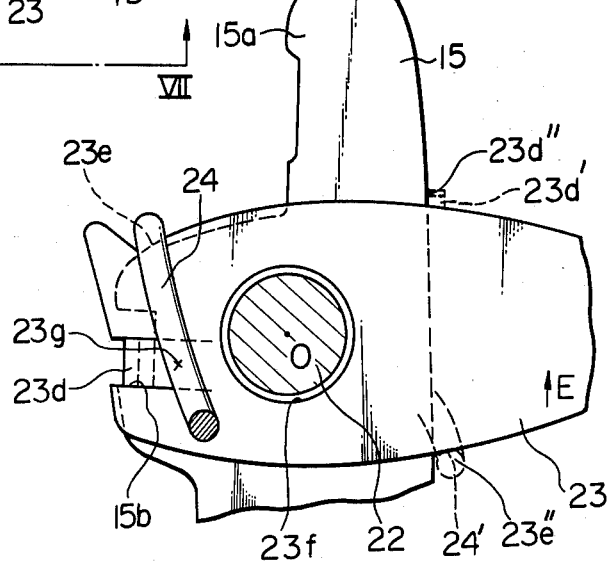

AUTOMATIC SHOE CLEARANCE ADJUSTING DEVICE IN SHOE DRUM BRAKE

BACKGROUND OF THE INVENTION

This invention relates to automatic shoe clearance adjusting devices in shoe drum brakes for use in vehicles such as automobiles or the like.

Automatic shoe clearance adjusting devices are generally mounted in shoe drum brakes for adjusting the clearance between the shoe and the drum to a desired value automatically when the clearance has increased according to wear of shoe lining.

One prior art automatic shoe clearance adjusting device comprises a strut of adjustable length including a first strut member having a hollow portion for slidably receiving a male thread portion of a second strut member, an adjust nut having ratchet teeth on the outer periphery thereof and engaging with the male thread portion of the second strut member with one side surface of the adjust nut abutting with an open end of the hollow portion of the first strut member. An adjust lever is pivotally connected to one end of the strut (one end of either of the first and second strut members) and is pivotable in response to the actuation of a hand brake lever so as to engage with the adjust nut to rotate it when shoe clearance exceeds a predetermined value, thereby maintaining a suitable shoe clearance by rotating the adjust nut relative to the second strut member.

In the aforementioned prior art shoe clearance adjusting device, it is necessary to arrange the adjust lever such that the adjust lever can escape from the adjust nut when the adjust lever returns to its original position after rotating the adjust nut (in a direction increasing the effective length of the strut) to prevent the reverse rotation of the adjust nut, and that the adjust lever can escape from the movement of the hand brake lever (having some amount of free movement relative to the hand brake lever) so as to permit the actuation of the hand brake lever even when the adjust lever cannot rotate because of rust or the like.

It has been proposed to mount the adjust lever pivotally on the hand brake lever with a coil spring acting therebetween so that the adjust lever is urged against the adjust nut by the compressive force of the coil spring and is urged in the direction of rotational movement of the hand brake lever by the torsional force of the coil spring. The adjust lever can escape in respective opposite directions when the coil spring deflects in respective opposite directions.

In the heretofore proposed devices, the torsional force of the coil spring acts to cause excessive frictional force between the adjust lever and the hand brake lever when the adjust lever escapes from the adjust nut against the compressive force of the coil spring, which tends to cause insufficient escape movement of the adjust lever from the adjust nut, thereby resulting reverse rotation of the adjust nut.

Further, in the heretofore proposed devices, the coil spring does not necessarily contact at a predetermined position relative to the adjust lever for transmitting compressive force. Thus, it has been difficult to obtain a stable urging force acting on the adjust nut. Further, parallelism between the hand brake lever and the adjust lever will sometimes be impaired by the compressive force of the coil spring and clearance adjustment will not be performed.

An object of the present invention is to remove the shortcomings of the prior art automatic shoe clearance adjusting device of the aforementioned type by a special construction of the adjust lever and coil spring arrangement.

BRIEF DESCRIPTION OF THE DRAWINGS

Various embodiments of the present invention are shown in accompanying drawings in which:

FIG. 2 is a partially sectional enlarged view of the automatic shoe clearance adjusting device in FIG. 1.

FIG. 3 is an enlarged cross sectional view taken along line III—III in FIG. 1 to show a side view of the device of FIG. 2, wherein the back plate is omitted.

FIG. 4 is an enlarged view of the adjust lever shown in FIG. 2.

FIG. 5 is a side view of the adjust lever of FIG. 4.

FIG. 6 is an enlarged cross-sectional partial view showing the relation between the hand brake lever, the adjust lever, the supporting shaft and the coil spring of FIG. 2.

FIG. 7 is a side view as viewed along line VII—VII in FIG. 6.

DETAILED DESCRIPTION OF THE INVENTION

Figure 1:
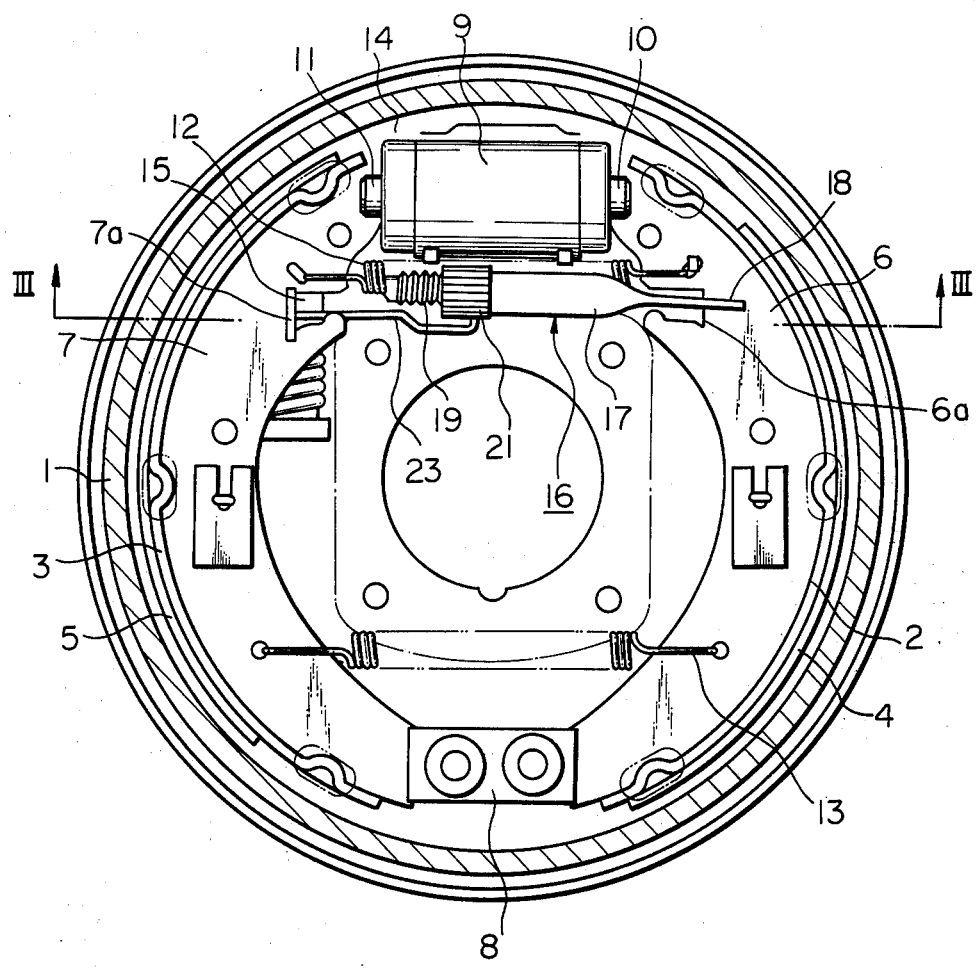
FIG. 1 is a front view of a shoe drum brake incorporating an automatic shoe clearance adjusting device according to the invention.
Figure 8:
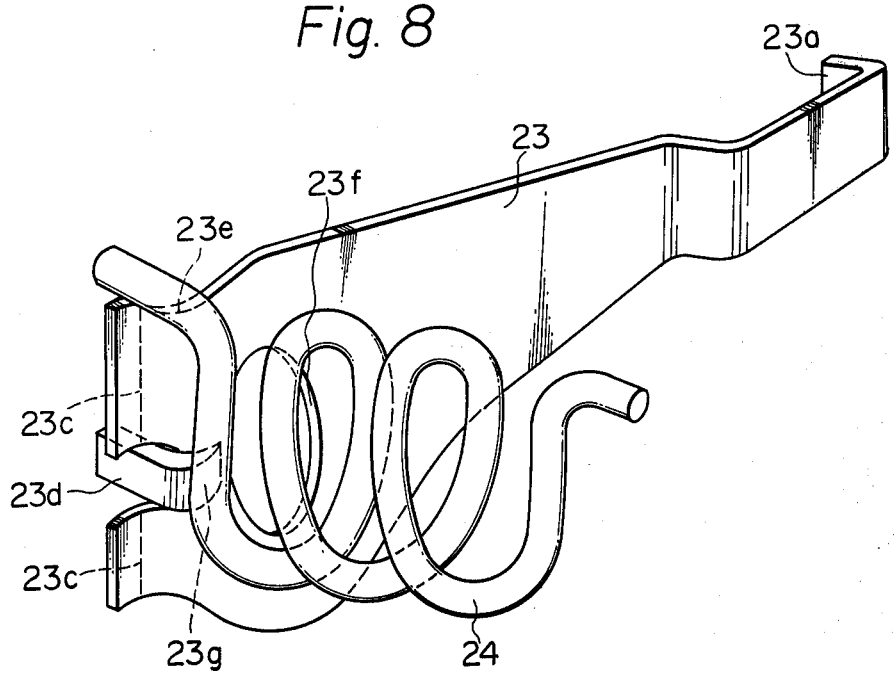
FIG. 8 is an enlarged perspective view of the adjust lever and the coil spring assembled in position in the shoe drum brake of FIG. 1.

In FIG. 1, the reference numeral 1 denotes a brake drum secured to a wheel (not shown) for rotation therewith. Shoes 2 and 3 having respectively linings 4 and 5 bonded on respective surfaces thereof are disposed inside of the drum 1. One end of each of the shoes 2 and 3 is supported on an anchor 8, and the other ends of the shoes 2 and 3 abut respectively with the opposite ends 10 and 11 of a brake cylinder 9. Two springs 12 and 13 extend respectively between the shoes 2 and 3 for urging the shoes toward each other. The brake cylinder 9 and the anchor 8 are secured on a stationary back plate 14.

As shown clearly in FIGS. 2 and 3, a hand brake lever 15 having a tip end 15a engaging with a cut-out portion 7a of web 7 of the shoe 3 is provided for manually applying the brake, and acts between the shoes 3 and 2 through a strut 16. A first strut member 17 of the strut 16 has a fork portion 18 for engaging with a cut-out portion 6a of web 6 of the shoe 2. The first strut member 17 has a hollow portion for slidably receiving male thread portion 20 of a second strut member 19. The male thread portion 20 threadingly engages with an adjust nut 21 which has ratchet teeth on the outer circumference thereof. One of the side surfaces of the adjust nut 21 abuts with the open end of the hollow portion of the first strut member 17. The second strut member 19 is pivotally mounted to the hand brake lever 15 through a supporting shaft 22 which is secured to the hand brake lever 15. An adjust lever 23 is pivotally mounted on the supporting shaft 22, and the tip end 23a thereof acts as a pawl for cooperating with the ratchet teeth of the adjust nut 21.

As shown in FIGS. 4 and 5, the adjust lever 23 has transverse projections 23c and a generally L-shaped detent 23d. The detent 23d defines a projection 23g projecting oppositely relative to the projections 23c. Further, a recessed portion 23e is formed in the upper side portion of the end portion 23b as shown in FIG. 5 for locating one end of a spring 24. The recessed portion 23e and the detent 23d of the adjust lever 23 are disposed at positions at substantially the same radial distance from the center 0 of the pivotal movement of the lever 23, or at the axis of the supporting shaft 22.

The spring 24 acts as both a compression and a torsion spring and surrounds the supporting shaft 22. One end of spring 24 abuts with the recessed portion 23e as mentioned above, and the other end of spring 24 engages with a groove 22b (FIG. 3) formed in a flanged portion 22a secured to or formed on the lower end of the shaft 22 as shown in FIG. 2. Thus, the lever 23 receives torsional force turning the lever 23 around the center 0 in the counterclockwise direction in FIGS. 3 and 5 (the direction of arrow B). Further, the spring 24 abuts with the projecting portion 23g of the lever 23 and a side surface of the flanged portion 22a as most clearly shown in FIGS. 9 or 10 for transmitting compressive force to the lever 23 which urges the adjusting lever in the direction of arrow A in FIG. 2 around a fulcrum defined by the projections 23c.

The detent 23d of the lever 23 is received in a cut-out portion formed in the hand brake lever and one side surface 15b of the cut-out portion abuts normally with one side surface of the detent 23d so as to act as a stopper which receives torsional force of the spring 24 transmitted through the recessed portion 23e.

In applying the hand brake, the hand brake lever 15 is rotated in the direction of arrow C in FIG. 3. The brake shoes 2 and 3 are expanded by the hand brake lever 15 and the strut 16. The adjust lever 23 follows the movement of the hand brake lever 15 and rotates in the same direction receiving the torsional force of the spring 24. When wear in the lining 4 or 5 is excessive, the adjust nut 21 is rotated. When hand brake is released, the adjust lever 23 moves in the direction of arrow D in FIG. 2 against the compressive force of the spring 24 around the fulcrum defined by the projections 23c abutting with the adjacent side surface of the hand brake lever 15 so that the pawl 23d of the adjust lever 23 will ride over one or more teeth of the ratchet teeth of the adjust nut 21 without rotating the adjust nut in the reverse direction. When the adjust nut 21 is rotated, the second strut member 19 will be moved out from the first strut member 17 to compensate for the wear of the lining 4 or 5.

As heretofore described, it is necessary that the adjust lever 23 acts reliably to rotate the adjust nut 21 in applying hand brake and to move away from the adjust nut 21 in releasing hand brake for preventing reverse rotation of the adjust nut 21. These requirements can be attained by reducing the frictional force between the adjust lever 23 and the supporting shaft 22 and/or the hand brake lever 15 to thereby afford smooth movement of the adjust lever 23 in the direction of arrows A and D in FIG. 2, and to reduce the compressive force of the spring 24. The reduced frictional force assures smooth movement of the pawl 23a of the adjust lever 23 in both directions approaching toward and retracting from the adjust nut 21 while receiving relatively small compressive force from the spring 24, thereby obtaining reliable engagement between the pawl 23a and the ratchet teeth and also smooth riding over movement of the pawl retracting from the ratchet teeth.

Further, it is necessary to remove excessive play between the adjust lever 23 and the hand brake lever 15 in the rotational direction for improving the adjusting characteristics of the device.

According to one of the features of the present invention, the projections 23c of the adjusting lever 23 (which act as a fulcrum during movement of the lever in the directions of the arrows A and D), the recessed portion 23e (that point on which the torsional force of the spring 24 acts) and the detent 23d (that point from which the torsional force of the spring 24 is received by the hand brake lever 15) are disposed adjacent with each other. Thus, unnecessary frictional force will not be caused by the torsional force of the spring 24, which will be described hereinafter in detail.

Assuming that the torsional force of previous spring 24' is transmitted to the adjust lever at a point 23e" in FIG. 7 and is transmitted from the adjust lever to the hand brake lever at a point 23d" in FIGS. 6 and 7, thus, when the adjust lever 23 moves around the fulcrum 23c in the directions of arrows A and D substantial frictional force will occur between a detent 23d' and the hand brake lever, according to the torsional force of a spring 24'. However, according to the present invention, the detent 23d and the projections 23c are disposed adjacent to each other, and the relative frictional movement between the detent 23d of the adjust lever 23 and the stopper 15b of the hand brake lever when the adjust lever 23 pivotally moves in the direction of arrow D will become minimum.

Further, assuming that the torsional force of the spring 24' acts on the point 23e" in FIG. 7 the adjust lever 23 will receive a moment turning the lever 23 in the direction of arrow E in FIG. 7 around the point 23d", and a portion of the opening 23f will be urged against the supporting shaft 22 which will cause substantial frictional force when the lever 23 pivotally moves in the direction of arrow D in FIG. 6. However, according to the present invention, the torsional force of the spring 24 acting on the point 23e will be transmitted to the hand brake lever 15 through the detent 23d. Thus, any such moment will not act on the adjust lever 23 and a suitable clearance can be maintained between the opening 23f and the supporting shaft 22 over the entire periphery thereof.

Further, it is possible to improve the adjusting characteristics of the device since the clearance between the opening 23f and the supporting shaft 22 can be minimized without increasing frictional resistance therebetween.

Figure 11:
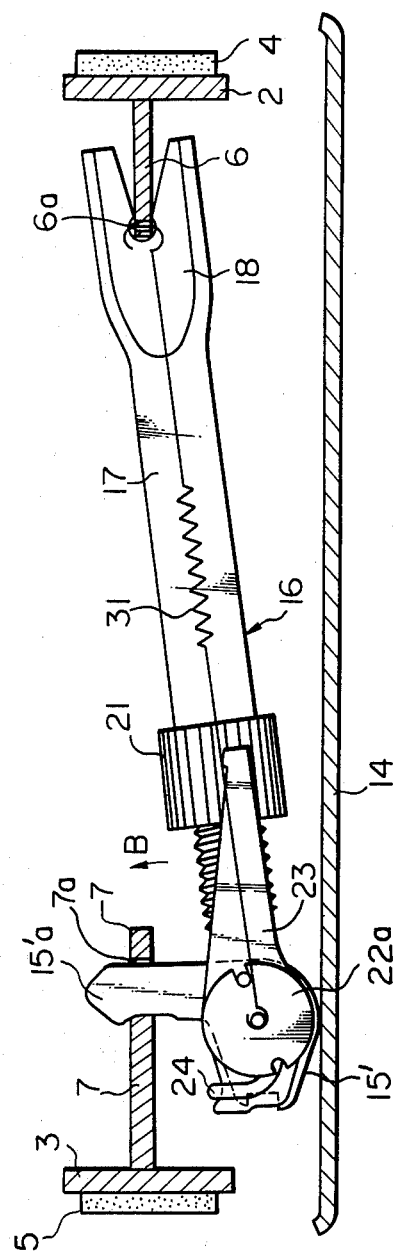
FIG. 11 is a view similar to FIG. 3, wherein the hand brake lever is replaced by an adjust lever mounting member.

In the illustrated embodiment, the shoe clearance adjusting function is performed when the hand brake lever is actuated, but it will be noted that the present invention may be applicable to a shoe drum brake of the type in which the automatic adjustment function is performed when the brake is actuated hydraulically. In FIG. 11, the hand brake lever is modified to form an adjust lever mounting member 15' by omitting the lever portion 15c, the tip end portion 15'a of the member 15' is inserted into an opening 7a formed in the web 7 of the shoe 3, and the other end portion of the member 15' is rotatably and slidably supported on the back plate 14. The supporting shaft 22 is urged toward the shoe 2 by suitable spring means 31. Thus, the lever 15 and the adjust lever 23 are rotated when the shoes 2 and 3 are separated by actuating wheel cylinder 9, and excessive clearance between the drum and shoe linings is automatically adjusted upon applying the foot brake.

Further, the adjust nut 21 is rotated during the separating stroke of the shoes 2 and 3 in the illustrated embodiments, but it is possible to arrange such that the adjustment is effected during the releasing stroke of the shoes 2 and 3, by disposing the direction of the pawl 23a of the adjust lever 23 and the ratchet teeth of the nut 21 oppositely, and the direction of the torsional force of the spring 24 oppositely.

The projecting portion 23g of the adjust lever 23 acts to determine the point through which compressive force of the spring 24 is transmitted to the lever 23. Thus, the lever 23 receives a substantially constant moment around the fulcrum 23c in the direction of arrow A. Further, in the the projecting portion 23g is located between the projections 23c of the lever 23 as viewed in FIG. 5, thus, any undesirable turning moment around the lengthwise axis of the adjust lever 23 will not occur.

Figure 9:
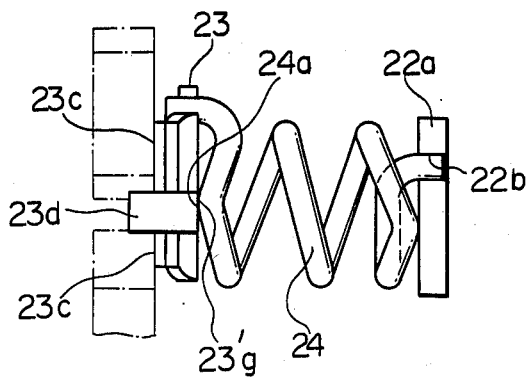
FIG. 9 is a view taken generally along line IX—IX in FIG. 6, but with the adjust lever shown in a modified form.
Figure 10:
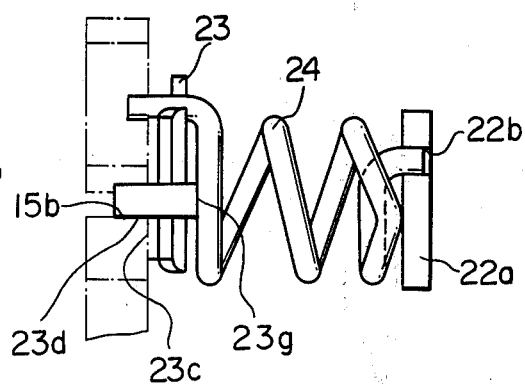
FIG. 10 is a view similar to FIG. 9 but showing a further modified form.

In a modified form shown in FIG. 9 a projecting portion 24a is formed in the coil spring 24 for abutting with a generally flat side surface of the adjust lever 23 for defining an abutting portion 23'g.

What is claimed is:

1. An automatic shoe clearance adjusting device for adjusting the clearance between the drum and brake shoe linings of a brake system of the shoe-drum type, said adjusting device being of the type including a lever having a first end engaging with a first shoe and a second end, a strut of adjustable length and having a first end engaging with a second shoe and a second end, a supporting shaft pivotally connecting said second end of said lever with said second end of said strut, said strut comprising a first strut member contacting said second shoe and having a hollow portion, a second strut member pivoted to said supporting shaft and having a threaded portion extending into said hollow portion of said first strut member, and an adjust nut threadingly engaging said threaded portion of said second strut member and having on the outer periphery thereof ratchet teeth, an adjust lever mounted on said surrounding shaft and having a pawl engageable with said ratchet teeth of said adjusting nut for rotating said adjusting nut on said threaded portion of said second strut member to move thereon in a direction toward said first strut member, and coil spring means mounted on said supporting shaft for transmitting compressive force to said adjust lever to normally move said pawl thereof into engagement with said ratchet teeth of said adjusting nut and for transmitting torsional force to said adjust lever, to thereby rotate said adjust lever about said supporting shaft and thereby rotate said adjust nut in response to movement of said lever; the improvement wherein:

said coil spring means has a first end engaging said adjust lever at a torsional force receiving point;

said adjust lever has means engaging said lever at a torsional force transmitting point;

said adjust lever has a portion engaging said lever at a fulcrum about which said adjust lever pivots in response to compressive force of said coil spring means;

said torsional force receiving point and said torsional force transmitting point being positioned adjacent each other and at distances approximately equally spaced from the central axis of said supporting shaft; and said fulcrum being located at a position adjacent and closer to both said torsional force receiving point and said torsional force transmitting point than said central axis of said supporting shaft.

2. An automatic shoe clearance adjusting device as claimed in claim 1, wherein said lever comprises a hand brake lever, said supporting shaft is mounted on said hand brake lever, and a first end of said hand brake lever engages with an inner end of a web of said first shoe.

3. An automatic shoe clearance adjusting device as claimed in claim 1, wherein said lever comprises an adjust lever mounting member, said supporting shaft is mounted on said adjust lever mounting member which is urged toward said second shoe by a tension spring, and a projection of said adjust lever mounting member extends through an opening formed in said first shoe.

4. An automatic shoe clearance adjusting device as claimed in claim 1, wherein said adjust lever has a projection engaging said coil spring means to receive compressive force therefrom.

* * * * *